US008655027B1

(12) United States Patent
Olthoff

(10) Patent No.: US 8,655,027 B1
(45) Date of Patent: Feb. 18, 2014

(54) METHOD OF IMAGE-BASED USER AUTHENTICATION

(75) Inventor: Kenneth G. Olthoff, Linthicum, MD (US)

(73) Assignee: The United States of America, as Represented by the Director, National Security Agency, Washington, DC (US)

( * ) Notice: Subject to any disclaimer, the term of this patent is extended or adjusted under 35 U.S.C. 154(b) by 559 days.

(21) Appl. No.: 13/066,853

(22) Filed: Mar. 25, 2011

(51) Int. Cl.
G06K 9/00 (2006.01)

(52) U.S. Cl.
USPC ........................................ 382/118; 382/115

(58) Field of Classification Search
None
See application file for complete search history.

(56) References Cited

U.S. PATENT DOCUMENTS

| 6,570,498 | B1 | 5/2003 | Frost et al. | |
|---|---|---|---|---|
| 6,832,724 | B2 | 12/2004 | Yavid et al. | |
| 6,944,319 | B1 * | 9/2005 | Huang et al. | 382/118 |
| 7,233,684 | B2 | 6/2007 | Fedorovskaya et al. | |
| 7,246,244 | B2 | 7/2007 | Nanavati et al. | |
| 7,287,158 | B2 * | 10/2007 | Futamura et al. | 713/156 |
| 7,346,195 | B2 | 3/2008 | Lauper et al. | |
| 7,508,960 | B1 | 3/2009 | Bolle et al. | |
| 7,650,034 | B2 * | 1/2010 | Hammoud | 382/225 |
| 7,676,063 | B2 * | 3/2010 | Cohen et al. | 382/103 |
| 7,873,190 | B2 * | 1/2011 | Yuasa et al. | 382/118 |
| 8,064,685 | B2 * | 11/2011 | Solem et al. | 382/154 |
| 8,488,913 | B2 * | 7/2013 | Lin et al. | 382/299 |
| 2001/0026631 | A1 * | 10/2001 | Slocum et al. | 382/115 |
| 2006/0093183 | A1 * | 5/2006 | Hosoi | 382/103 |
| 2006/0208169 | A1 * | 9/2006 | Breed et al. | 250/221 |
| 2007/0277224 | A1 | 11/2007 | Osborn et al. | |
| 2008/0244700 | A1 | 10/2008 | Osborn et al. | |
| 2008/0279424 | A1 * | 11/2008 | Berrani et al. | 382/118 |
| 2010/0021018 | A1 * | 1/2010 | Lee et al. | 382/118 |
| 2010/0034432 | A1 * | 2/2010 | Ono et al. | 382/118 |
| 2010/0098299 | A1 * | 4/2010 | Muquit et al. | 382/115 |
| 2010/0177929 | A1 * | 7/2010 | Kurtz et al. | 382/103 |

* cited by examiner

Primary Examiner — Jason M Repko
Assistant Examiner — Jhere Rowland
(74) Attorney, Agent, or Firm — Robert D. Morelli

(57) ABSTRACT

A method of authenticating a user by capturing an image of the user, assigning a user-name, selecting an image category, selecting a pattern, selecting locations on the user's face, assigning a rotation-value, logging onto a computer, presenting images, where some images are in the image category, selecting images that are the pattern away from the images in the image category, calculating a rotation angle, projecting the selected images that are rotated by the rotation angle onto the user's face at the locations, capturing an image of the user's face with the rotated images projected thereon, and authenticating the user if the user's facial features match the user's face and the projected images are the pattern away from the images in the image-category, are at the locations, are rotated by the rotation angle, and exhibit distortion consistent with the contour of the user's face.

12 Claims, 1 Drawing Sheet

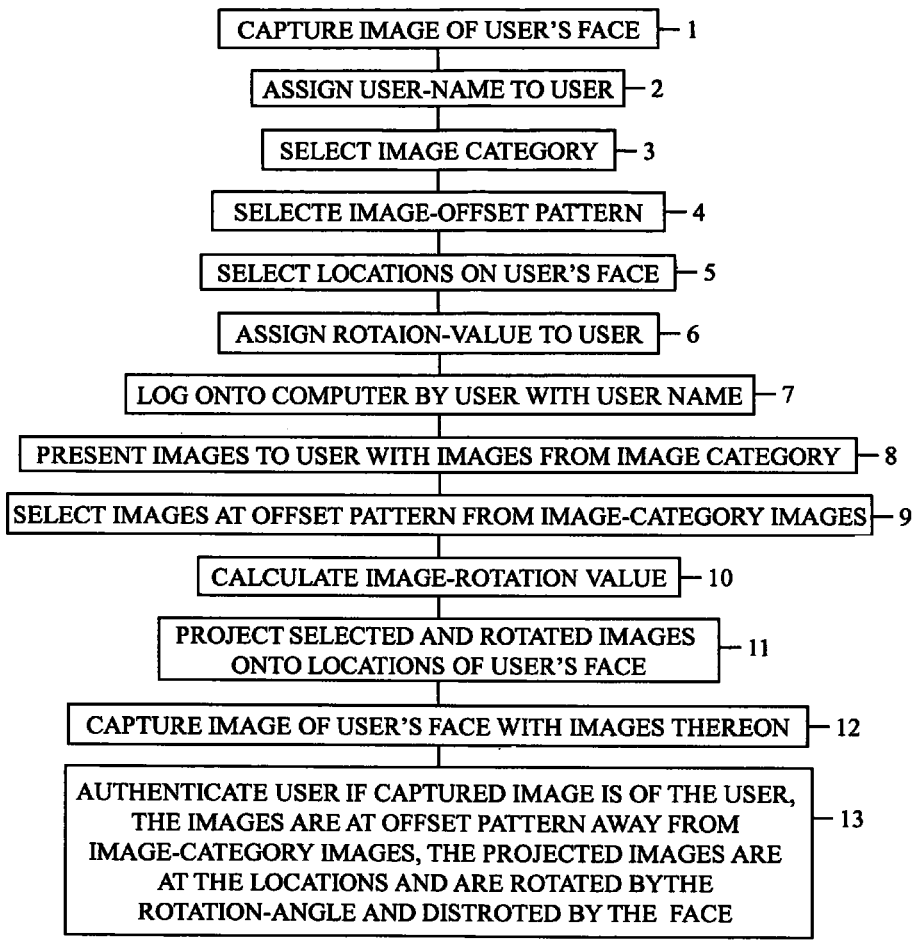

METHOD OF IMAGE-BASED USER AUTHENTICATION

FIELD OF THE INVENTION

The present invention relates, in general, to information security, and, in particular to access control or authentication.

BACKGROUND OF THE INVENTION

Computer systems are used for an ever increasing assortment of tasks, someone of which requiring validation or authentication of the user. Authentication methods such the use of a fixed password are susceptible to compromise (i.e., logging keystrokes of looking over the shoulder of the person typing in the password). So, there is a need for a method to authenticate the identity of a computer user that is not susceptible to compromise. The present invention is such a method.

U.S. Pat. No. 6,570,498, entitled "INTEGRATED ACCESS SYSTEM," discloses a system and method for enhancing access control with a video capture system that is used in conjunction with either a key or proximity card access system. U.S. Pat. No. 6,570,498 is hereby incorporated by reference into the specification of the present invention.

U.S. Pat. No. 6,832,724, entitled "ELECTRO-OPTICAL ASSEMBLY FOR IMAGE PROJECTION, ESPECIALLY IN PORTABLE INSTRUMENTS," discloses a system and method for displaying an image on a viewing surface. U.S. Pat. No. 6,832,724 is hereby incorporated by reference into the specification of the present invention.

U.S. Pat. No. 7,233,684, entitled "IMAGING METHOD AND SYSTEM USING AFFECTIVE INFORMATION," discloses a system and method for capturing an image of a scene and collecting affective information. U.S. Pat. No. 7,233,684 is hereby incorporated by reference into the specification of the present invention.

U.S. Pat. No. 7,246,244, entitled "IDENTIFY VERIFICATION METHOD USING A CENTRAL BIOMETRIC AUTHORITY," discloses a method for enhancing an electronic transaction by the sender creating a message for both the receiver and a central authority, the central authority message containing the sender's biometric sample. U.S. Pat. No. 7,246,244 is hereby incorporated by reference into the specification of the present invention.

U.S. Pat. No. 7,287,158, entitled "PERSON AUTHENTICATION SYSTEM, PERSON AUTHENTICATION METHOD, INFORMATION PROCESSING APPARATUS, AND PROGRAM PROVIDING MEDIUM," discloses a system for authenticating a person by comparing user template information against user information entered during a transaction. U.S. Pat. No. 7,287,158 is hereby incorporated by reference into the specification of the present invention.

U.S. Pat. No. 7,346,195, entitled "BIOMETRIC IDENTIFICATION AND AUTHENTICATION METHOD," discloses an authentication method that uses involuntary eye movement patterns. U.S. Pat. No. 7,346,195 is hereby incorporated by reference into the specification of the present invention.

U.S. Pat. No. 7,508,960, entitled "PROJECTION OF LIGHT PATTERNS FOR LIVENESS VERIFICATION OF BIOMETRICS," discloses a biometric verification system that uses the projection of light onto a person. U.S. Pat. No. 7,508,960 is hereby incorporated by reference into the specification of the present invention.

U.S. Pat. Appl. Pub. Nos. 20070277224 and 20080244700, each entitled "METHODS AND SYSTEMS FOR GRAPHICAL IMAGE AUTHENTICATION," disclose methods and devices for superimposing password elements onto images presented to a user, where the user uses the password elements associated with images from a predetermined category as the password for a particular computer session. U.S. Pat. Appl. Pub. Nos. 20070277224 and 20080244700 are hereby incorporated by reference into the specification of the present invention.

SUMMARY OF THE INVENTION

It is an object of the present invention to authenticate a computer user so that authentication cannot be compromised by either keystroke monitoring or looking over the shoulder of the user.

The first step of the method of the present invention is capturing on a computing device a facial image of a user.

The second step of the method is assigning on the computing device a user-definable user-name to the user.

The third step of the method is selecting on the computing device a user-definable image category for the user.

The fourth step of the method is selecting on the computing device a user-definable image-offset pattern for the user.

The fifth step of the method is selecting on the computing device at least two user-definable locations on the user's face.

The sixth step of the method is assigning on the computing device a user-definable rotation-value to the user.

The seventh step of the method is logging onto the computing device by the user using the user's user-name.

The eighth step of the method is presenting to the user on the computing device a time and a grid of a plurality of images, where at least two of the images are in the user-definable image category selected in the third step.

The ninth step of the method is selecting on the computing device by the user at least two images in the grid of images that are at the offset pattern from each of the at least two images in the image category selected in the third step.

The tenth step of the method is calculating on the computing device an image-rotation angle that is a function of the rotation value assigned in the sixth step and the time presented in the eighth step. (hour mod 4 and minute plus rotation-value mod 360)

The eleventh step of the method is projecting the images selected in the ninth step onto the user's face at the at least two locations selected in the fifth step and at the image-rotation angle calculated in the tenth step.

The twelfth step of the method is capturing on the computing device an image of the user's face with the images as projected thereon as a result of the eleventh step.

The thirteenth step of the method is authenticating the user if the user's facial features captured in the twelfth step match the user's face captured in the first step, the images projected onto the use's face that were captured in the twelfth step are images in the grid that are the offset-pattern away from images in the grid that are in the image-category selected in the third step, the images projected onto the user's face that were captured in the twelfth step are at locations on the user's face that were selected in the fifth step, and the images projected onto the user's face that were captured in the twelfth step are rotated within a user-definable tolerance from a twelve o'clock position at the image-rotation angle calculated in the tenth step.

BRIEF DESCRIPTION OF THE DRAWING

FIG. 1 is a flowchart of steps of the method of the present invention.

DETAILED DESCRIPTION OF THE INVENTION

The present invention is a method of authenticating a computer user so that authentication cannot be compromised by either keystroke monitoring or looking over the shoulder of the user.

FIG. 1 is a flowchart of the method of the present invention.

The first step 1 of the method of the present invention is capturing on a computing device a facial image of a user.

The second step 2 of the method is assigning on the computing device a user-definable user-name to the user. For example, a user-name may be "User1."

The third step 3 of the method is selecting on the computing device a user-definable image category for the user. In the example, the image category selected is flowers.

The fourth step 4 of the method is selecting on the computing device a user-definable image-offset pattern for the user. In the example, the image-offset pattern is two positions to the left and one position up, where the pattern wraps around the edges of the grid when necessary. The image-offset pattern is used to obfuscate the image category of the user to an adversary that may be watching the user select an image. That is, when the user's image is flowers, an adversary may learn this if the selection process was not obfuscated and the adversary observed the user selecting an image of a flower. To obfuscate the image selection process, instead of selecting an image of a flower, the user would select an image that is the image-offset pattern away from the image of a flower. Since there is always an edge to a grid of images, the image-offset pattern wraps around the edge of any grid. In the example, if the image category is flowers, the image-offset pattern is two positions to the left and one position up, and an image of a flower is in the top row of a grid of images then the user would select the image in the grid that is two positions to the left of the image of a flower and in the bottom row of the grid. For the image category to be successfully obfuscated, the selected image should have no association with the selected image category (e.g., the selected image is an image of a car when the image category is flowers).

The fifth step 5 of the method is selecting on the computing device at least two user-definable locations on the user's face. In the example, two facial locations are the chin and the forehead of the user.

The sixth step 6 of the method is assigning on the computing device a user-definable rotation-value to the user. In the example, the rotation-value is 157.

The seventh step 7 of the method is logging onto the computing device by the user using the user's user-name.

The eighth step 8 of the method is presenting to the user on the computing device a time and a grid of a plurality of images, where at least two of the images are in the user-definable image category selected in the third step 3. In the example, a grid of 20 images in a 4 rows by 5 columns grid and a time of 1145, where there are two images associated with the image category of flowers at grid positions, one in row 1, column 4 and another one in row 4, column 5, where rows are numbers from top to bottom, and columns are numbers from left to right. In the preferred embodiment, the grid of images presented is sufficiently different from a number of previously presented image grids (e.g., not more than 50% of the images in the image grid presented to the user may consist of images in the last 20 image grids presented to the user, the at least two images that are in the user-definable image category may not have been used more than 5 times in the 20 previous image grids, and the at least two images that are in the user-definable image category may not have appeared in the same locations more than 5 times in the 20 previous image grids.

The ninth step 9 of the method is selecting on the computing device by the user at least two images in the grid of images that are at the offset pattern from each of the at least two images in the image category selected in the third step 3. In the example, the image in the grid at the offset-pattern from row 1, column 4 would be at row 4, column 2 (e.g., an image of a barn), and the image in the grid at the offset-pattern from row 4, column 5 would be at row 3, column 3 (e.g., an image of a rabbit).

The tenth step 10 of the method is calculating on the computing device an image-rotation angle that is a function of the rotation value assigned in the sixth step 6 (e.g., 157) and the time presented in the eighth step 8 (e.g., 1145). In the preferred embodiment, the function is the hour of the time modulo 4 as the most significant bit of a three bit number (e.g., 11 mod 4=3 to form 3xx, where xx are numbers to be determined next, the minutes in the time as the two least significant bits in the three bit number (e.g., 45 to form 345) plus the image rotation value modulo 360 (e.g., (345+157) modulo 360=502 mod 360=142 degrees from the twelve o'clock position).

The eleventh step 11 of the method is projecting the images selected in the ninth step 9 (e.g., a rabbit and a barn) onto the user's face at the at least two locations selected in the fifth step 5 (e.g., chin and forehead), where each projected image is rotated from a twelve o'clock position by the image-rotation angle calculated in the tenth step 10 (e.g., 142 degrees from the twelve o'clock position).

The twelfth step 12 of the method is capturing on the computing device an image of the user's face after the operation of the eleventh step 11.

The thirteenth step 13 of the method is authenticating the user on the computing device if the user's facial features captured in the twelfth step 12 match the user's face captured in the first step 1, the images projected onto the use's face that were captured in the twelfth step 12 (e.g., rabbit and barn) are images in the grid that are the offset-pattern (e.g., two positions to the left and one position up in the grid) away from images (e.g., images associated with flowers) in the grid that are in the image-category (e.g., flowers) selected in the third step 3, the images projected onto the user's face that were captured in the twelfth step 12 are at locations on the user's face that were selected in the fifth step 5 (e.g.,; chin and forehead), the images projected onto the user's face that were captured in the twelfth step 12 are rotated within a user-definable tolerance (e.g., plus or minus 10 degrees) from a twelve o'clock position at the image-rotation angle calculated in the tenth step 10 (e.g., 142 degrees), and the images projected onto the user's face that were captured in the twelfth step 12 exhibit a user-definable amount of distortion due to the contour of the user's face as compared to how the images would appear on a flat surface (e.g., an amount of distortion that would be consistent with an image being projected onto the user's face).

What is claimed is:

1. A method of authenticating a computer user, comprising the steps of:
   a) capturing on a computing device a facial image of a user;
   b) assigning on the computing device a user-definable user-name to the user;

c) selecting on the computing device a user-definable image category for the user;

d) selecting on the computing device a user-definable image-offset pattern for the user;

e) selecting on the computing device at least two user-definable locations on the user's face;

f) assigning on the computing device a user-definable rotation-value to the user;

g) logging onto the computing device by the user using the user's user-name;

h) presenting to the user on the computing device a time and a grid of a plurality of images, where at least two of the images are in the user-definable image category selected in step (c);

i) selecting on the computing device by the user at least two images in the grid of images that are at the offset pattern from each of the at least two images in the image category selected in step (c);

j) calculating on the computing device an image-rotation angle that is a function of the rotation value assigned in step (f) and the time presented in step (h);

k) projecting the images selected in step (i) onto the user's face at the at least two locations selected in the step (e), where each projected image is rotated by the image-rotation angle calculated in step (j);

l) capturing on the computing device an image of the user's face after the operation of step (k); and m) authenticating the user on the computing device if the user's facial features captured in step (l) match the user's face captured in step (a), the images projected onto the use's face that were captured in step (l) are images in the grid that are the offset-pattern away from images in the grid that are in the image-category selected in step (c), the images projected onto the user's face that were captured in step (l) are at locations on the user's face that were selected in step (e), the images projected onto the user's face that were captured in step (l) are rotated within a user-definable tolerance from a twelve o'clock position at the image-rotation angle calculated in step (j), and the images projected onto the user's face that were captured in step (l) exhibit a user-definable amount of distortion due to the contour of the user's face as compared to how the images would appear on a flat surface.

2. The method of claim 1, wherein said step of selecting on the computing device a user-definable image-offset pattern for the user is comprised of selecting on the computing device an image-offset pattern for the user that is two positions to the left and one position up, where the image-offset pattern wraps around an edge of the grid when necessary.

3. The method of claim 1, wherein said step of assigning on the computing device a user-definable rotation-value to the user is comprised of assigning on the computing device an integer to the user.

4. The method of claim 1, wherein said step of presenting to the user on the computing device a time and a grid of a plurality of images, where at least two of the images are in the user-definable image category selected in step (c) is comprised of presenting to the user on the computing device a current local time and a grid of 20 images in a 4 rows by 5 columns grid.

5. The method of claim 1, wherein said step of presenting to the user on the computing device a time and a grid of a plurality of images, where at least two of the images are in the user-definable image category selected in step (c) is comprised of presenting to the user on the computing device a current local time and a grid of images where not more than 50% of the images in the image grid presented to the user consist of images that appear in the last 20 image grids presented to the user, the at least two images that are in the user-definable image category may not have been used more than 5 times in the last 20 image grids presented to the user, and the at least two images that are in the user-definable image category may not have appeared in the same locations more than 5 times in the last 20 image grids presented to the user.

6. The method of claim 1, wherein said step of calculating on the computing device an image-rotation angle that is a function of the rotation value assigned in step (f) and the time presented in step (h) is comprised of calculating on the computing device an image-rotation angle where an hour of a current local time modulo 4 is a most significant bit of a three bit number, minutes of the current local time are two least significant bits in the three bit number, adding the resulting three bit number to the image rotation value, and reducing the result modulo 360.

7. The method of claim 1, wherein said step of authenticating the user on the computing device if the user's facial features captured in step (l) match the user's face captured in step (a), the images projected onto the use's face that were captured in step (l) are images in the grid that are the offset-pattern away from images in the grid that are in the image-category selected in step (c), the images projected onto the user's face that were captured in step (l) are at locations on the user's face that were selected in step (e), the images projected onto the user's face that were captured in step (l) are rotated within a user-definable tolerance from a twelve o'clock position at the image-rotation angle calculated in step (j), and the images projected onto the user's face that were captured in step (l) exhibit a user-definable amount of distortion due to the contour of the user's face as compared to how the images would appear on a flat surface is comprised of authenticating the user on the computing device if the user's facial features captured in step (l) match the user's face captured in step (a), the images projected onto the use's face that were captured in step (l) are images in the grid that are the offset-pattern away from images in the grid that are in the image-category selected in step (c), the images projected onto the user's face that were captured in step (l) are at locations on the user's face that were selected in step (e), the images projected onto the user's face that were captured in step (l) are rotated within plus and minus ten degrees from a twelve o'clock position at the image-rotation angle calculated in step (j), and the images projected onto the user's face that were captured in step (l) exhibit distortion consistent with effects of the contour of the user's face as compared to how the images would appear on a flat surface.

8. The method of claim 2, wherein said step of assigning on the computing device a user-definable rotation-value to the user is comprised of assigning on the computing device an integer to the user.

9. The method of claim 8, wherein said step of presenting to the user on the computing device a time and a grid of a plurality of images, where at least two of the images are in the user-definable image category selected in step (c) is comprised of presenting to the user on the computing device a current local time and a grid of 20 images in a 4 rows by 5 columns grid.

10. The method of claim 9, wherein said step of presenting to the user on the computing device a time and a grid of a plurality of images, where at least two of the images are in the user-definable image category selected in step (c) is comprised of presenting to the user on the computing device a current local time and a grid of images where not more than 50% of the images in the image grid presented to the user consist of images that appear in the last 20 image grids presented to the user, the at least two images that are in the user-definable image category may not have been used more than 5 times in the last 20 image grids presented to the user, and the at least two images that are in the user-definable image category may not have appeared in the same locations more than 5 times in the last 20 image grids presented to the user.

11. The method of claim 10, wherein said step of calculating on the computing device an image-rotation angle that is a function of the rotation value assigned in step (f) and the time presented in step (h) is comprised of calculating on the computing device an image-rotation angle where an hour of a current local time modulo 4 is a most significant bit of a three bit number, minutes of the current local time are two least significant bits in the three bit number, adding the resulting three bit number to the image rotation value, and reducing the result modulo 360.

12. The method of claim 11, wherein said step of authenticating the user on the computing device if the user's facial features captured in step (l) match the user's face captured in step (a), the images projected onto the use's face that were captured in step (l) are images in the grid that are the offset-pattern away from images in the grid that are in the image-category selected in step (c), the images projected onto the user's face that were captured in step (l) are at locations on the user's face that were selected in step (e), the images projected onto the user's face that were captured in step (l) are rotated within a user-definable tolerance from a twelve o'clock position at the image-rotation angle calculated in step (j), and the images projected onto the user's face that were captured in step (l) exhibit a user-definable amount of distortion due to the contour of the user's face as compared to how the images would appear on a flat surface is comprised of authenticating the user on the computing device if the user's facial features captured in step (l) match the user's face captured in step (a), the images projected onto the use's face that were captured in step (l) are images in the grid that are the offset-pattern away from images in the grid that are in the image-category selected in step (c), the images projected onto the user's face that were captured in step (l) are at locations on the user's face that were selected in step (e), the images projected onto the user's face that were captured in step (l) are rotated within plus and minus ten degrees from a twelve o'clock position at the image-rotation angle calculated in step (j), and the images projected onto the user's face that were captured in step (l) exhibit distortion consistent with effects of the contour of the user's face as compared to how the images would appear on a flat surface.

* * * * *